United States Patent [19]

Armstrong

[11] Patent Number: 4,539,399

[45] Date of Patent: Sep. 3, 1985

[54] BONDED PHASE MATERIAL FOR CHROMATOGRAPHIC SEPARATIONS

[75] Inventor: Daniel W. Armstrong, Lubbock, Tex.

[73] Assignee: Advanced Separation Technologies Inc., Whippany, N.J.

[21] Appl. No.: 635,133

[22] Filed: Jul. 27, 1984

[51] Int. Cl.³ .......................... B01D 15/08; C08L 5/16
[52] U.S. Cl. ................................... 536/103; 210/502.1
[58] Field of Search ....................... 536/103; 210/502.1

[56] References Cited

U.S. PATENT DOCUMENTS

| | | | |
|---|---|---|---|
| 3,002,823 | 10/1961 | Flodin et al. | 536/103 |
| 4,118,316 | 10/1973 | Talley et al. | 210/502.1 |
| 4,426,292 | 1/1984 | Wernick et al. | 210/635 |
| 4,448,711 | 5/1984 | Motojima et al. | 210/502.1 |

FOREIGN PATENT DOCUMENTS

| | | | |
|---|---|---|---|
| 1493047 | 1/1969 | Fed. Rep. of Germany | 527/300 |
| 2086405 | 5/1982 | United Kingdom | 536/103 |

Primary Examiner—Ronald W. Griffin
Attorney, Agent, or Firm—Samuelson & Jacob

[57] ABSTRACT

A highly selective bonded phase material useful to separate a wide variety of organic and inorganic substances by thin layer chromatography (TLC), liquid chromatography (LC) or high performance liquid chromatography (HPLC) is produced by bonding a cyclodextrin to a silica gel by means of a specific silane linkage. The preparation of such materials and their uses are described.

14 Claims, 9 Drawing Figures

BONDED PHASE MATERIAL FOR CHROMATOGRAPHIC SEPARATIONS

The present invention relates to a novel material for use in high performance liquid chromatography (HPLC), liquid chromatography (LC) or thin layer chromatography (TLC), its preparation and its use to effect improved separations. More particularly, it pertains to a material in which cyclodextrins are bonded to silica gels by specific non-hydrolytic silane linkages.

The utilization of cyclodextrins in chromatographic separations and purification methods is described in a review article by W. L. Hinze published in *Separation and Purification Methods* 10(2) 159–237 (1981) and in the references cited therein, and more recently in Wernick et al, U.S. Pat. No. 4,426,292, issued Jan. 17, 1984, and in the references cited therein.

The present invention relates to the preparation of a highly selective bonded phase useful to separate a wide variety of organic and inorganic substances by high performance liquid chromatography, liquid chromatography, or thin layer chromatography.

The basis for the selectivity of the bonded phase is the ability of cyclodextrins to form inclusion complexes. According to the review article by Hinze, cited above, the use of these cyclodextrins in the solid or dissolved state produced separations based on structural differences. Initially, for chromatographic purposes, the cyclodextrins were used as mobile phases on currently available media. The use of cyclodextrin solutions as chromatographic mobile phases were sometimes effective, but had several drawbacks. Typical problems included the lack of sufficient solubility of Beta-cyclodextrin, the high cost of Gamma- or Alpha-cyclodextrin and the relatively poor efficiency of these solutions in TLC. One attempted solution to these problems involved binding the cyclodextrin molecule to an insoluble support in such a way that the cyclodextrin remained free to interact with dissolved solutes. Another approach tried was the polymerization of the cyclodextrin by reaction with epichlorohydrin. A gel matrix was formed producing a system with both pressure and solvent limitations and of very low efficiency. Efforts to couple cyclodextrins to a solid matrix (silica gel) using amine or amide linkages reportedly gave reasonable results, but the bonds were hydrolytically unstable, placing severe limitations on the use of aqueous phases. In addition, the use of these nitrogen-containing linkages resulted in the formation of nitroxides which lessened the amount of cyclodextrin that could be bonded and gave the material a brown color. The presence of nitroxides and amines render this material unsuitable for TLC. Furthermore, the synthesis to produce the amide linkage is very tedious.

Cyclodextrins, known for the ability to form inclusion complexes in their hydrophobic cavity, have long been used in solution form. The present invention provides a solid bonded form of the material for high performance liquid chromatography. The materials of this invention are individual cyclodextrins coupled to a high-purity silica gel through unique chemistry to form stable non-hydrolytic and non-nitrogen containing bonds. The toroid structure formed by the glucose units in the cyclodextrins has the secondary hydroxyl groups on the larger circumference and the primary hydroxyl groups on the smaller cicumference of the toroid, as will be illustrated hereinafter.

The most unique characteristic of cyclodextrins is their ability to include selectively a variety of organic and inorganic molecules within their hydrophobic cavity. Typical included molecules range in size from gases to acyl coenzyme A compounds. As a stationary phase, the orientation of these substances into the toroid structure allows for the easy separation of isomers such as ortho, meta and para substituted rings. Although the sequence of retention for the latter on Beta-cyclodextrin is generally para/ortho/meta, the characteristic separation is dependent upon many factors, among which are dipole-dipole interaction, hydrogen bonding and hydrophobic interaction. The strength of inclusion complexing allows for very great selectivity and very exacting reproducibility. Inclusion complex formation is strongest in aqueous systems; therefore, these HPLC and LC columns generally are run in mobile phases with moderate to high water compositions. However, competitive exchanges can be set up in order to obtain unusual separations with solvent mixtures, as in reversed phase arrangements.

Typical separations of structural isomers or enantiomeric mixtures on reversed phase columns take advantage of only very weak differences in bonding energies and are therefore limited and often ineffective. With cyclodextrins, the guest molecule is retarded by both its physical orientation in the toroid structure and the asymmetrical surrounding of hydrogen bonding sites. This is because cyclodextrin is a chiral molecule and each glucose unit contains five chiral atoms; therefore, Beta-cyclodextrin contains thirty-five chiral atoms. Furthermore, the 2-hydroxyl groups, located at the entrance of the hydrophobic cyclodextrin cavity, are all pointed in a clockwise direction, as will be shown below. Cyclodextrins, therefore, provide a much stronger and more intimate contact with an asymmetric environment than can be obtained with any currently available bonded phase. As a result, enantiomers and a variety of other isomeric compounds form inclusion complexes of different stabilities with cyclodextrins and therefore can be separated from one another.

The present invention is based on the provision of specific linkages between silica gel and a hydroxyl-containing molecule, namely, a cyclodextrin, which linkages are hydrolytically stable and which are therefore suitable for a wide variety of separations previously not readily attainable by standard stationary phases.

One object of the present invention is to provide new and improved materials for use in HPLC, LC and TLC.

Another object of the invention is to provide a method for the preparation of such materials.

Still another object of the invention is to effect improved separations of closely related organic materials, such as isomers, enantiomers and the like, by the use of the novel materials of this invention.

These and other objects will become apparent or will be pointed out in the description which follows in which preferred embodiments of the invention are described, taken in conjunction with the accompanying drawing, in which.

Figure 1:
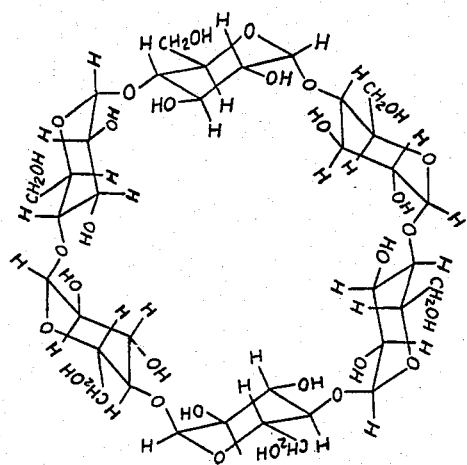
FIG. 1 is a schematic view of Alpha-cyclodextrin.
Figure 2:
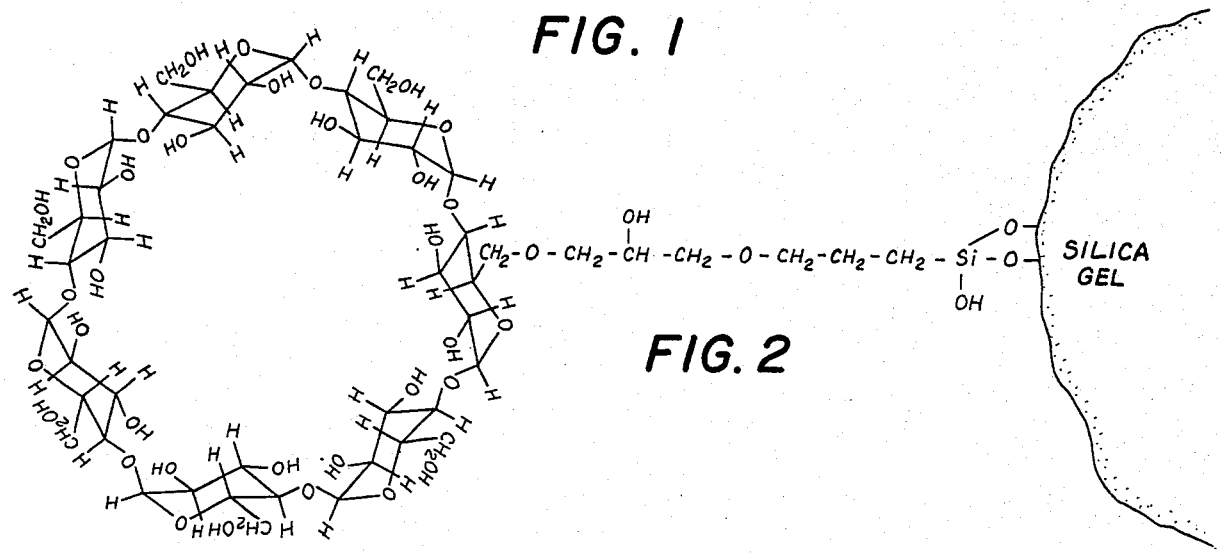
FIG. 2 is a similar view showing Beta-cyclodextrin linked to silica gel by a silane linkage in accordance with the invention.
Figure 3:
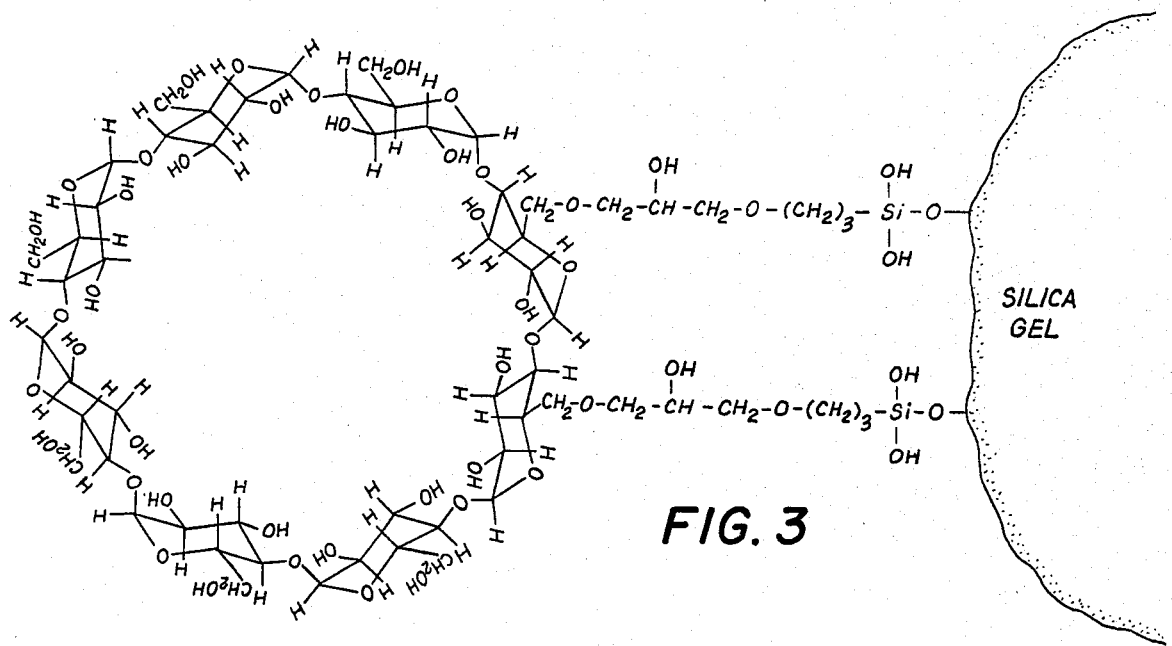
FIG. 3 is a similar view showing Gamma-cyclodextrin linked to silica gel by a plurality of silane linkages in accordance with the invention.

Briefly, the components of the chromatographic materials of this invention comprise the following:

(1) an appropriate silica gel;
(2) a cyclodextrin; and
(3) a linkage joining the silica gel to the cyclodextrin.

1. The Silica Gel

While a wide variety of commercially available silica gels are suitable for the practice of this invention, a preferred silica gel is one sold by Phasesep (British) as SPHERISORB. In this gel, which consists of spherical particles with a pore diameter of 8 nm and a mean particle size of five microns, most of the hydroxyl groups are readily available for bonding to the cyclodextrins with which they are ultimately linked. In some circumstances it may be desirable to wash the silica gel with acid to remove iron, followed by a washing with water and then methanol, before silanizing it. Subsequently, the material is heated in order to dry the material.

2. The Linkage Materials

A variety of linkage materials have been found to be suitable for joining the cyclodextrin to the silica gel, as will appear from the following description.

A. The first group of linkages is illustrated by the following silanes:

(1) 3-glycidoxypropyl trimethoxy silane;
(2) 3-glycidoxypropal dimethylchloro silane; and
(3) 3-glycidoxypropyl triethoxy silane.

When compounds (1), (2) or (3) are reacted with an anhydrous slurry of silica gel in toluene, three possible routes coupling the active end group to silica gel are:

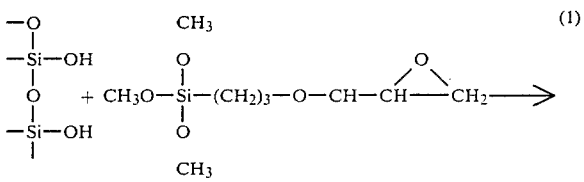
(1)

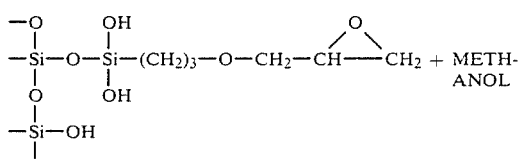
(2)

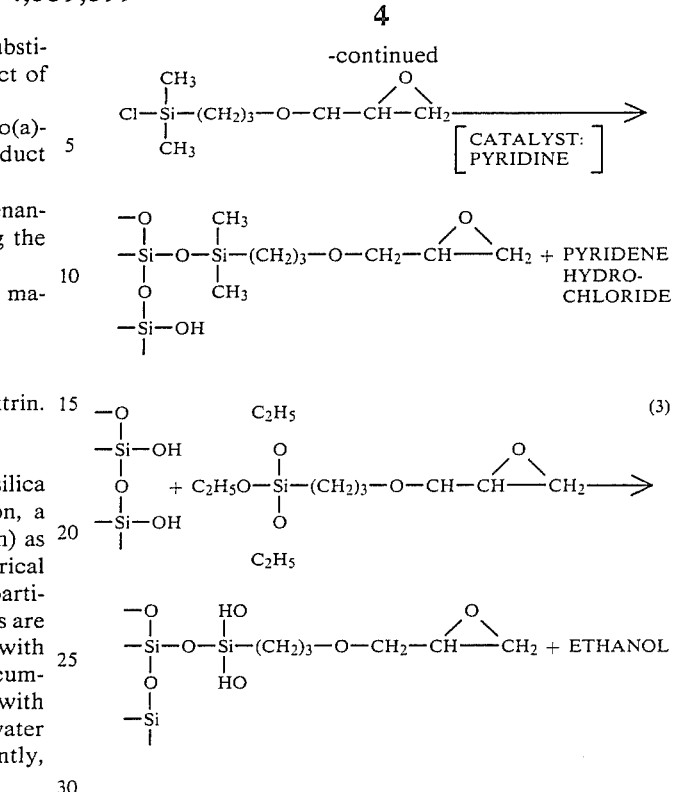

It is possible that more than one binding site is linked from the silica gel to the terminal reactive silane depending on the proximity of silanols.

More generally the first group of linkage materials may be considered to be those represented by the formula

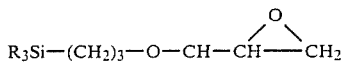

in which each R is selected from the group consisting of methoxy, ethoxy, lower alkyl, Cl or Br. Not all of the R's need be the same.

This reaction is well known from the literature and many other silanes have been described which undergo similar reactions. It should be noted that the epoxy end group must remain unreacted and intact after coupling to the silica gel has occurred. When the epoxy end group is reacted with cyclodextrin or other organic molecules containing an OH group (the reaction being carried out in an organic solvent such as dimethyl formamide or pyridine), the reaction between the epoxide group and a hydroxyl or hydroxyls on the outside of the cyclodextrin torus yield, as a product, materials shown schematically as follows:

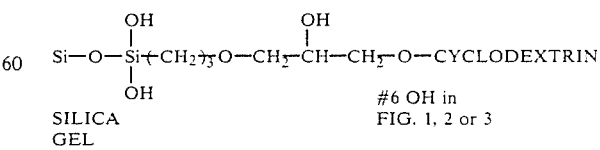

Although linkage can occur through either primary or secondary hydroxyl groups, linkage occurs more commonly through the primary groups which are less sterically hindered.

B. The second type of linkage is illustrated by 7-octenyl dimethyl chlorosilane:

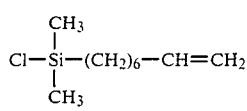

Other silanes are of the formula

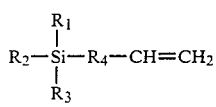

in which each of $R_1$, $R_2$, and $R_3$ is selected from methoxy, ethoxy, alkyl or halogen and $R_4$ is an alkyl chain with from three to twenty carbon atoms.

C. A third route to the desired linkage involves a silane having an alkyl halide group such as 8-bromooctyltrichlorosilane:

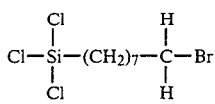

An anhydrous slurry of silica gel reacts with the silane to form one to three linkages:

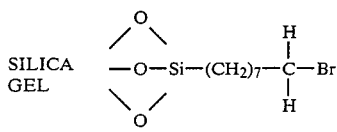

Although three linkages are shown above, the formation of one or two bonds is somewhat more likely because of steric hindrance.

The direct coupling of cyclodextrin to silanized silica gel "A" or "C" is accomplished using a sodium hydride treated cyclodextrin. Silanized silica gel "B" must first be converted to the epoxide or halide form before cyclodextrin coupling can occur. The resultant product can be silanized further to end cap residual silica gel surface hydroxyls with reactive silanes such as TMCS - trimethyl chlorosilane, HMDS - hexamethyldisilazane, and the like to complete the blockage of surface silanols.

While all three possible bonding mechanisms produce fairly stable bonds, the ability to end cap to the greatest degree is accomplished by silanizing the bromooctene derivatized silica gel before coupling to cyclodextrin. Endcapping produces a more stable silica gel since the silanols on the surface of the silica are sites most susceptible to dissolution in high aqueous systems.

It should be noted that the linkage between silica gel and cyclodextrin can be carried out with shorter or longer chains, e.g., from three or four to up to twenty carbon atoms. With chains as short as three carbon atoms in the silane, coupling the cyclodextrin is more difficult to accomplish because of the relative size of the cyclodextrin. With chains as long as eighteen to twenty carbon atoms there is a danger of losing resolution in the separation process.

EXAMPLES

The following examples illustrate the practice of the present invention.

EXAMPLE 1

Twenty grams of $5\mu$ SPHERISORB (Phasesep) silica gel were dried at 170° C. overnight. The dry silica gel was added to 250 ml of dry toluene and stirred to make a slurry (in a 1000 ml three-neck flask with a magnetic stirrer). The slurry was heated to reflux until all water was removed (as an azeotrope into a Dean-Stark type trap. The slurry was cooled to between 90° C. and 95° C. Fifteen ml of dry 3-glycidoxypropyl trimethoxysilane was added and was stirred and allowed to react for three hours. At no time during the reaction was the temperature allowed to exceed 95° C. After three hours, the reaction mixture was cooled to room temperature, filtered and washed several times with toluene and methanol. The isolated functionalized silica gel was then dried in vacuo over $P_2O_5$ at 60° C.

EXAMPLES 2 & 3

Example 1 was repeated using 3-glycidoxypropyl methyldiethoxysilane or 3-glycidoxypropyl dimethylethoxysilane in place of the 3-glycidoxypropyl triethoxy silane of Example 1.

EXAMPLE 4

The silica gel and slurry were treated as in Example 1. Once the water-toluene azeotrope was removed, 1 ml of glacial acetic acid was added. While maintaining reflux temperature, 15 g of 8-bromooctyltrichlorosilane was added. The mixture was allowed to react at reflux temperatures for two hours. The reaction mixture was allowed to cool to room temperature, filtered and washed several times with toluene and methanol. The derivatized silica gel was again slurried with dry toluene, heated to reflux, and the water removed via distillation of the azeotrope. The 8-bromooctyl-derivatized silica gel was then endcapped by the addition of 2 ml of hexamethyldisilazane (HMDS) and 2 ml trimethylchlorosilane (TMCS) to the refluxing slurry. This mixture was allowed to react for two hours at reflux temperatures. The endcapped product was allowed to cool to room temperature and isolated and washed as in Example 1.

EXAMPLE 5

The silica gel and slurry were treated as in Example 1. Once the water-toluene azeotrope was removed, 10 ml of dry pyridine was added. The reaction mixture was cooled to 85° C. Fifteen grams of 7-octenyldimethylchlorosilane was added to the stirred slurry and allowed to react for two hours. The product was isolated and washed as in Example 1. This material also can be endcapped, as in Example 4, except that 10 ml of dry pyridine must be added prior to the reaction and the reaction temperature must not exceed 85° C. The total octenyl double bonds on the derivatized silica gel can be determined by titration with a standardized solution of bromine in carbon tetrachloride.

EXAMPLE 6

Example 5 was repeated using 7-octenyltrichlorosilane instead of 7-octenyldimethylchlorosilane.

EXAMPLE 7

Ten grams of the product of Example 5 was dried in vacuo over $P_2O_5$ at 100° C. overnight. A slurry of the dried product was made with 100 ml of dry chloroform (using a 250 ml, 3-neck round bottom flask). Five grams of dry peroxyacetic acid was dissolved in 25 ml of dry chloroform. This solution was added to the dry slurry of the dried product. The reaction mixture was stirred and was allowed to react at 95° C. for up to 12 hours. Aliquots were removed periodically and tested with $Br_2/CCl_4$ to see if the octenyl double bond had reacted. Once the double bond had reacted (i.e., no further decolorization of the $Br_2/CCl_4$ solution) the reaction was stopped, cooled to room temperature and filtered and washed as in Example 1. Any one of several peroxyorganic acids can be used (e.g. peroxyformic acid, m-chlorperoxy benzoic acid, etc.). Faster reacting peroxyacids are preferred, since long reaction times tend to result in lower yields of the epoxide product.

EXAMPLE 8

Ten grams of Beta-cyclodextrin were dried in vacuo over $P_2O_5$ at 100° C. overnight as were 10 grams of the product of Example 1. Ten grams of the latter were slurried with 200 ml of dry N, N-dimethylformamide in a 1000 ml, three-neck round bottom flask fitted with a reflux condenser. The dried Beta-cyclodextrin was placed in a dry box along with dry DMF, crystalline sodium hydride (Aldrich) a dry funnel, dried filter paper and two dried flasks. The following steps were performed under a dry $N_2$ atmosphere. Ten grams of dry Beta-cyclodextrin were completely dissolved in 125 ml of dry DMF in a 250 ml Erlenmeyer flask. After solution was complete, 3 gm of NaH were added to Beta-cyclodextrin solution The mixture was swirled to disperse the NaH throughout the solution. The NaH was allowed to react with the Beta-cyclodextrin in dry DMF for 15 minutes. The reaction mixture was then filtered (still under a dry atmosphere) to remove the excess NaH. While the excess NaH was being filtered in the dry box, the slurry of the product of Example 1 was kept dry. The 125 ml of filtered DMF containing the sodium salt of Beta-cyclodextrin was removed from the dry box and immediately added to the dry slurry of the product of Example 1. This mixture was stirred and heated to reflux where it was allowed to react for two hours. The reaction mixture then was allowed to cool to room temperature. At that point the cyclodextrin was completely bonded to the product of Example 1. The cyclodextrin bonded product was filtered and washed with DMF, methanol, toluene, methanol, water and methanol. The washed product was dried in vacuo over $P_2O_5$ at 60° C.

EXAMPLE 9

The products of Examples 2, 3, 4 and 7 were each reacted with Alpha-, Beta- or Gamma-cyclodextrins by the procedure described in Example 8.

A pictorial representation of a fragment of an alpha-cyclodextrin molecule containing six glucose units is shown in FIG. 1. Similar figures for Beta-, Gamma- and Delta-cyclodextrins could be drawn in which seven, eight or nine glucose units are present. The diameter of the torus increases as the number of glucose units increases, as shown in the following table:

| Cyclodextrin | Glucose Units | Diameter (Å) |
| --- | --- | --- |
| Alpha | 6 | 5.5 |
| Beta | 7 | 7.0 |
| Gamma | 8 | 8.5 |
| Delta | 9 | 10.5 |

The primary hydroxyls are those shown outside of the ring (torus in three dimensions) while the glycosidic oxygen bridges in the core provide the central passage with the desired hydrophobic characteristics.

EXAMPLE 10

Figure 4:
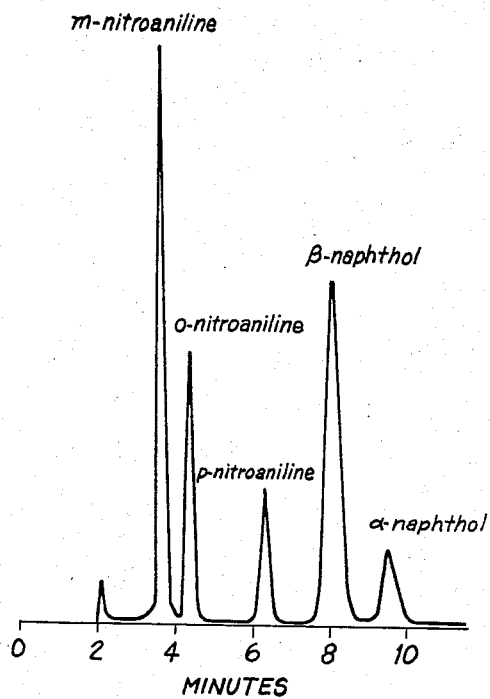
FIG. 4 is a graph showing the separation of substituted aromatic isomers by HPLC using the product of Example 8.

A column was prepared using the product of Example 8. The column was 250 mm long and 4.6 mm in diameter. A mixture containing o-, m- and p-anilines and α- and β- naphthols was separated by applying the aniline/naphthol mixture to the column. The analytes were separated using methanol/water 40/60 as the mobile phase flow at a rate of 1.0 ml/min. The results are shown in FIG. 4.

EXAMPLE 11

Figure 5:
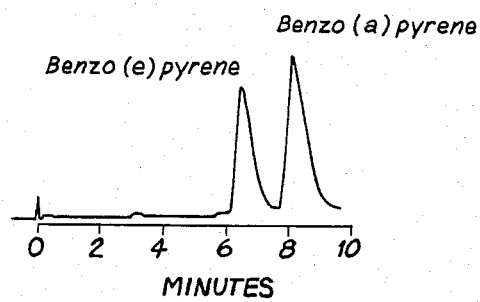
FIG. 5 is a graph showing the separation of benzo(a)pyrene and benzo(e)pyrene by HPLC using the product of Example 8.

Another column was prepared using the product of Example 8 as the bonded phase separatory material. A mixture of benzo(e)pyrene and benzo(a)pyrene was separated as shown in FIG. 5 using a 50/50 methanol/water mixture as the mobile phase, flowing at a rate of 1.5 ml/min.

EXAMPLE 12

Figure 6A:
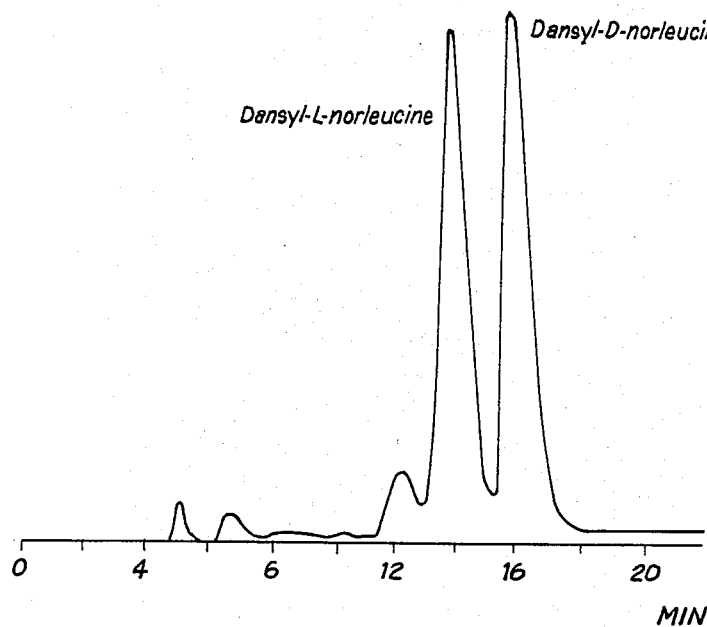
FIGS. 6(a) through 6(d) show the separation of enantiomers of dansylated amino acids by HPLC using the product of Example 8.
Figure 6B:
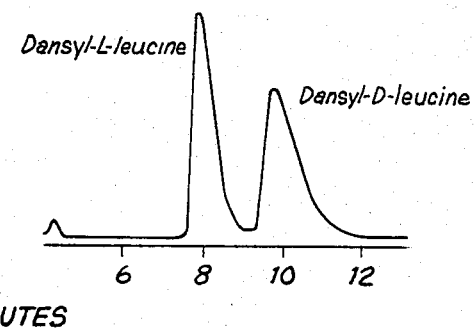
Figure 6C:
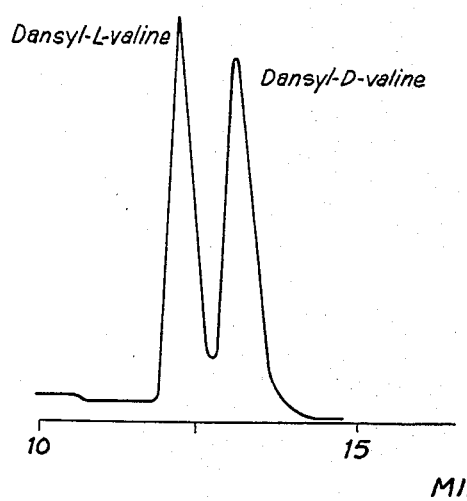
Figure 6D:
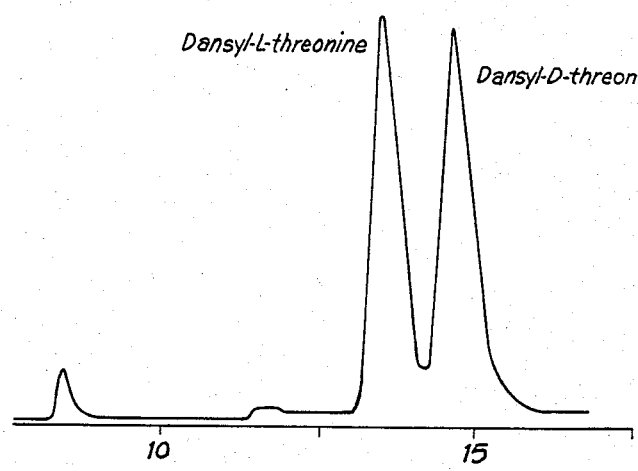

FIGS. 6(a)–6(d) illustrate the separation achieved using the product of Example 8 to separate mixtures of dansylated amino acids. A column was prepared as in the preceding examples and with a mobile phase of methanol/water 50/50 flowing at a rate of 0.25 ml/min. The separation of dansyl L-norleucine from dansyl D-norleucine is shown in FIG. 6(a), dansyl L-leucine from dansyl D-leucine in FIG. 6(b), dansyl L-valine from dansyl D-valine in FIG. 6(c) and dansyl L-threonine from dansyl D-threonine in FIG. 6(d).

It will be noted that the products produced by bonding cyclodextrins to silica gel in the manner described are free from ester Si-O-C and/or amide Si-N-C linkages which hydrolyze in water and hence are unsuitable for the intended separations. Furthermore, there is no nitrogen containing or hydrolyzable linkage (e.g., amine, amide or ester) anywhere in the chain between the cyclodextrin and the first silicon atom.

Having now described the invention, it is not intended that it be limited except as may be required by the appended claims.

The embodiments of the invention in which an exclusive property of privilege is claimed are defined as follows:

1. The process of producing an improved chromatographic separation material which comprises:
    (a) providing a silica gel in particle form;
    (b) reacting said silica gel with a silane having between two and twenty carbon atoms in the chain length thereof to produce a product with an active terminal group;
    (c) further reacting the active terminal group of said product with an active primary or secondary hydroxyl group or groups of a cyclodextrin, whereby said cyclodextrin is chemically bonded to said silica gel by said silane.

2. The process of claim 1 wherein the silane has a chain length between six and nine carbon atoms.

3. The process of claim 1 wherein the active terminal group on the silane is an epoxy group.

4. The process of claim 1 wherein step (c) is effected in an inert anhydrous organic solvent.

5. The process of claim 1 wherein step (b) is carried out in an anhydrous organic solvent.

6. The process of claim 1 wherein the active terminal group is an alkyl halide.

7. The process of claim 6 wherein the halide is a bromide, chloride or iodide.

8. The process of claim 1 wherein the active terminal group is an alkene.

9. The process of claim 1 wherein the silane is 3-glycidoxypropyltrimethoxy silane.

10. The process of claim 1 wherein the cyclodextrin is an Alpha-, Beta- or Gamma-cyclodextrin.

11. The product of the process of any of claims 1 through 10.

12. A process for separating mixtures of organic compounds by HPLC, LC or TLC which comprises:
 (a) producing an improved chromatographic separation material by the process of any of claims 1 through 10;
 (b) conducting said mixture of organic compounds to said material; and
 (c) effecting the said separation.

13. The process of claim 12 wherein the mixture contains organic compounds which are isomers. cm 14. The process of claim 12 wherein the mixture contains organic compounds which are enantiomers.

14. The process of claim 12 wherein the mixture contains organic compounds which are enantiomers.

* * * * *